Patented July 5, 1927.

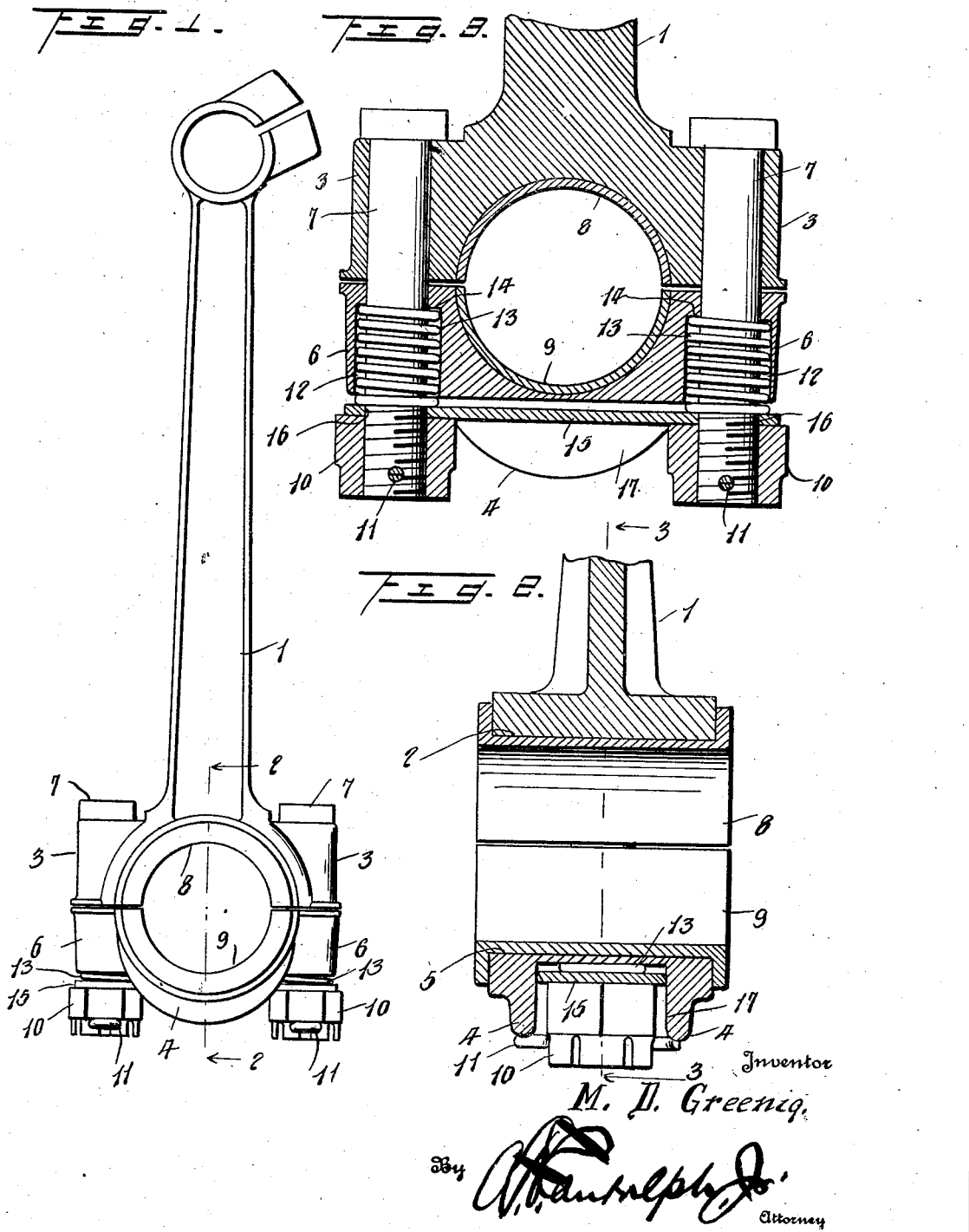

1,634,993

UNITED STATES PATENT OFFICE.

MERLIN D. GREENIG, OF LA HARPE, ILLINOIS.

SELF-ADJUSTING CONNECTING-ROD BEARING.

Application filed October 26, 1926. Serial No. 144,293.

This invention relates to connecting rods for internal combustion engines, and more particularly to the bearings of such rods.

The invention has for one of its objects to provide a connecting rod wherein the cap of the bearing thereof shall be supported by novel and simple means adapted to constantly urge the cap in the direction of the connecting rod so as to take up any wear that may occur in the lining of the bearing.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a view in side elevation of a connecting rod equipped with a bearing embodying my invention, Figure 2 is a sectional view taken on the plane indicated by the line 2—2 of Figure 1, and Figure 3 is a sectional view taken on the plane indicated by the line 3—3 of Figure 2.

Referring to the drawing by reference numerals, 1 designates a connecting rod of the type used in connection with internal combustion engines. The connecting rod 1 is provided in its lower end with a semi-circular recess 2, and laterally beyond the recess with apertured lugs 3. A bearing cap 4 which is provided with a semi-cylindrical recess 5 and laterally beyond the recess with apertured lugs 6, is secured to the lower end of the connecting rod 1 by bolts 7. The recesses 2 and 5 form a bearing for the crank of the main shaft of the engine, and are lined as shown at 8 and 9 with Babbitt metal or any other suitable material. The nuts 10 of the bolts 7 are of the castellated type and secured in place by cotter keys 11.

In accordance with my invention, the lower portions of the lugs 6 are counterbored as shown at 12 for the reception of coil springs 13 and to provide annular shoulders 14 against which the upper ends of the springs bear. The lower ends of the springs 13 rest upon a flat bar 15 which extends longitudinally of the bearing cap 4 and is supported on the bolts 7 by the nuts 10. The bar 15 is provided with openings 16 for the reception of the bolts 7, and the bearing cap 4 is provided in its upper side with a recess 17 for the reception of the bar.

The diameter of the opening of the bearing is slightly less than the corresponding dimension of the crank of the engine shaft, whereby on the initial application of the connecting rod the bearing cap 4 will be slightly spaced from the lower end of the connecting rod. The springs 13 constantly urge the bearing cap 4 in the direction of the crank of the engine shaft, and due thereto any wear occurring in the linings 8 and 9 will be automatically taken up or compensated for. The tension of the springs 13 may be regulated through the medium of the nuts 10. The bar 15 not only provides seats for the springs 13. Should the openings in the lugs 3 or those in the lugs 6 become enlarged as the result of wear, the bar 15 would hold the bearing cap 4 against tilting movement with respect to the connecting rod 1 and hold the bolts 7 against relative lateral movement. It also compensates for any weakening of the bearing cap 4 as the result of the counter-boring of the lugs 6, and it further obviates any liability of the bearing cap 4 to tilt due to the counter-boring of said lugs.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

A connecting rod provided in the lower end thereof with a recess, bolts carried by the connecting rod at opposite sides of the recess, a bearing cap applied to said end of the connecting rod and provided in its upper side with a recess registering with said first named recess, the bearing cap being provided in its lower side with a recess, lugs carried by the bearing cap and apertured for the reception of the bolts, the lower portions of the lugs being counterbored, a bar mounted upon the bolts and extending through the lower recess of the bearing cap, and springs mounted upon the bolts and resting at their lower ends on the bar, the springs extending into the counterbored portions of the lugs and contacting with the bottom walls of said portions.

In testimony whereof I affix my signature.

MERLIN D. GREENIG.